US005249422A

United States Patent [19]

Smith et al.

[11] Patent Number: 5,249,422
[45] Date of Patent: Oct. 5, 1993

[54] APPARATUS FOR CALIBRATING THE SPEED OF HYDROSTATICALLY DRIVEN TRACTION MOTORS

[75] Inventors: Vernon R. Smith; Alan L. Stahl, both of Peoria, Ill.

[73] Assignee: Caterpillar Inc., Peoria, Ill.

[21] Appl. No.: 811,367

[22] Filed: Dec. 20, 1991

[51] Int. Cl.⁵ .......................................... F16D 31/02
[52] U.S. Cl. ................................ 60/426; 60/431; 60/445; 60/487; 91/515; 91/459
[58] Field of Search ............... 60/420, 421, 423, 426, 60/427, 429, 431, 434, 459, 445, 484, 487; 91/515, 521, 459; 417/43; 364/426.04, 431.12, 571.07

[56] References Cited

U.S. PATENT DOCUMENTS

| | | | |
|---|---|---|---|
| 4,077,484 | 3/1978 | Dezelan | 180/44 |
| 4,324,098 | 4/1982 | Aruga et al. | 60/420 |
| 4,354,420 | 10/1982 | Bianchetta | 91/6 |
| 4,366,541 | 12/1982 | Mouri et al. | 364/571.07 X |
| 4,376,371 | 3/1983 | Kojima et al. | 60/420 |
| 4,531,601 | 7/1985 | Barbagli | 180/6.48 |
| 4,583,371 | 4/1986 | Hoashi et al. | 60/426 |
| 4,751,633 | 6/1988 | Henn et al. | 364/431.12 X |
| 4,768,339 | 9/1988 | Aoyagi et al. | 60/427 |
| 4,908,760 | 3/1990 | Sinn | 364/571.07 X |
| 5,005,358 | 4/1991 | Hirata et al. | 60/426 |
| 5,029,067 | 7/1991 | Nishida et al. | 60/421 X |
| 5,048,293 | 9/1991 | Aoyagi | 60/427 X |

Primary Examiner—Edward K. Look
Assistant Examiner—Hoang Nguyen
Attorney, Agent, or Firm—R. Carl Wilbur

[57] ABSTRACT

A drive system for a work vehicle is provided which includes first and second hydrostatic transmissions which are responsive to respective control signals for driving first and second ground engaging devices at a rate responsive thereto. A sensor is provided sensing the position of a manually operable control element and responsively producing a desired speed signal. A memory device is adapted to store data relates the desired speed signal to the first and second control signals in a preselected manner. A processor is provided for receiving the desired speed signal, responsively retrieving at least a portion of the data from the memory device, and producing the first and second control signals in response to the retrieved data and the desired speed signal. An adjusting device is provided for receiving at least one of the control signals, permitting controllable adjustment of the control signal so as to vary the speed of a respective ground engaging device. An overwriting device is provided for receiving the adjusted control signal and overwriting a portion of the stored data in response to the adjusted control signal.

28 Claims, 13 Drawing Sheets

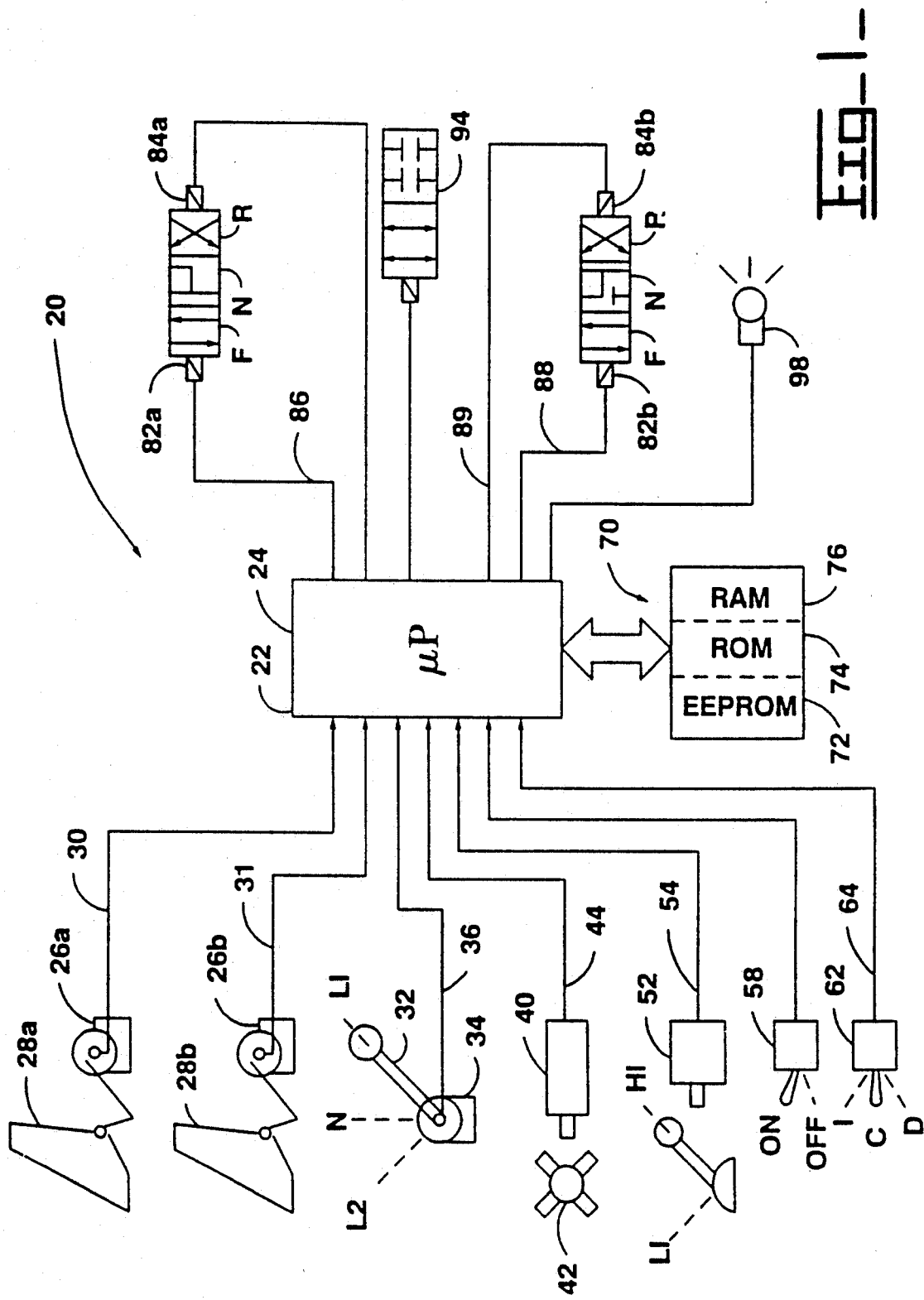

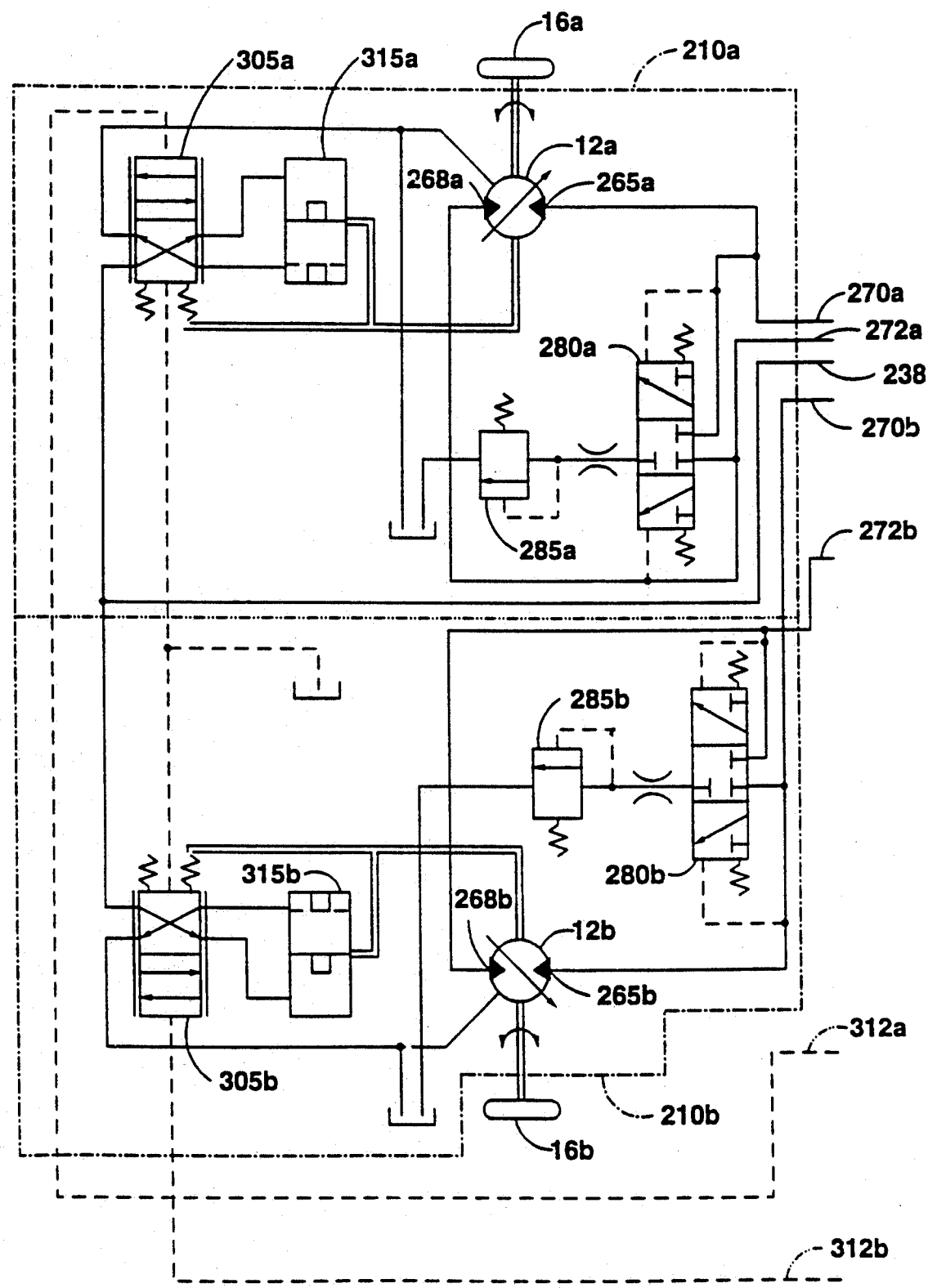
Fig_2A_

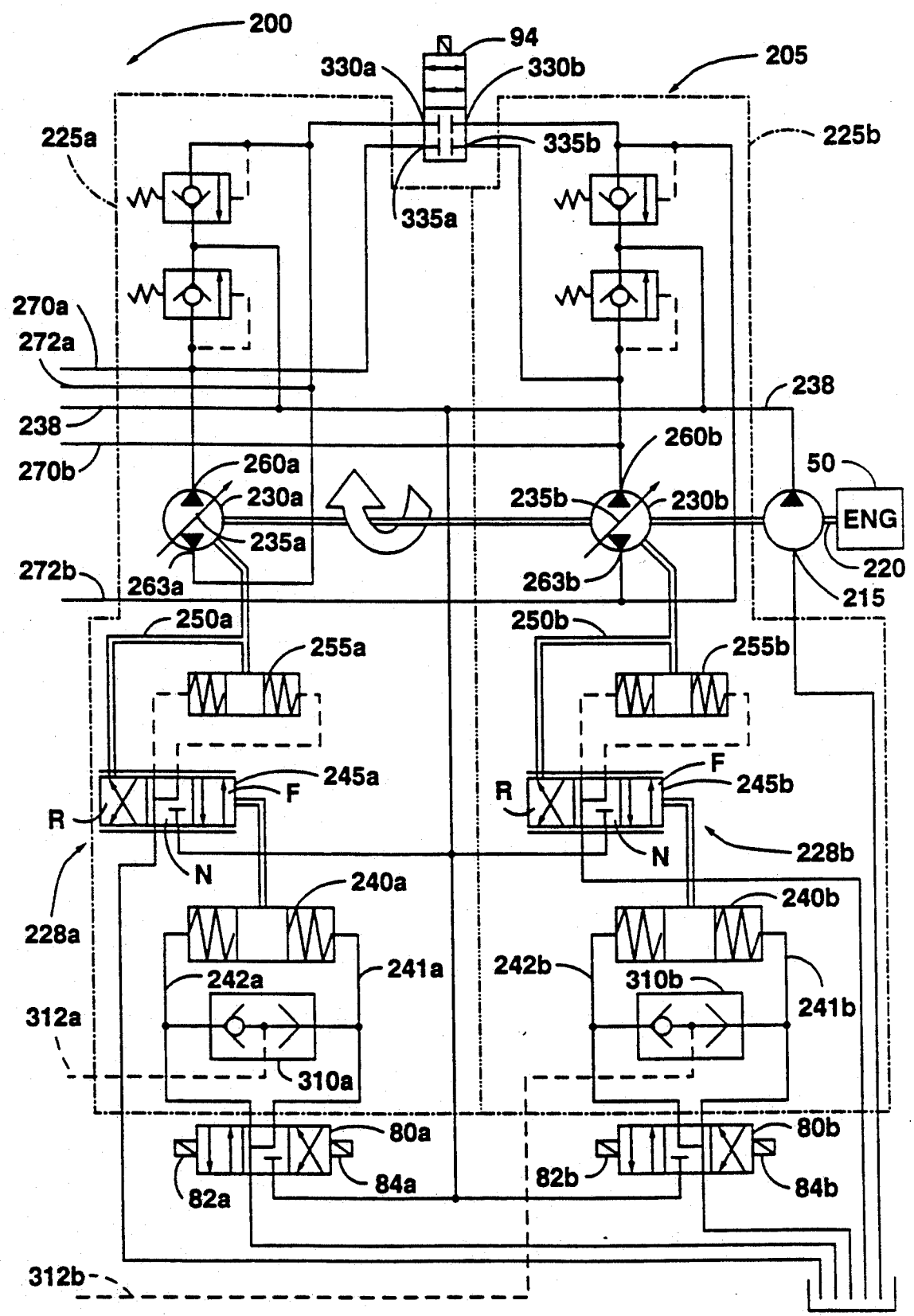
Fig_2B

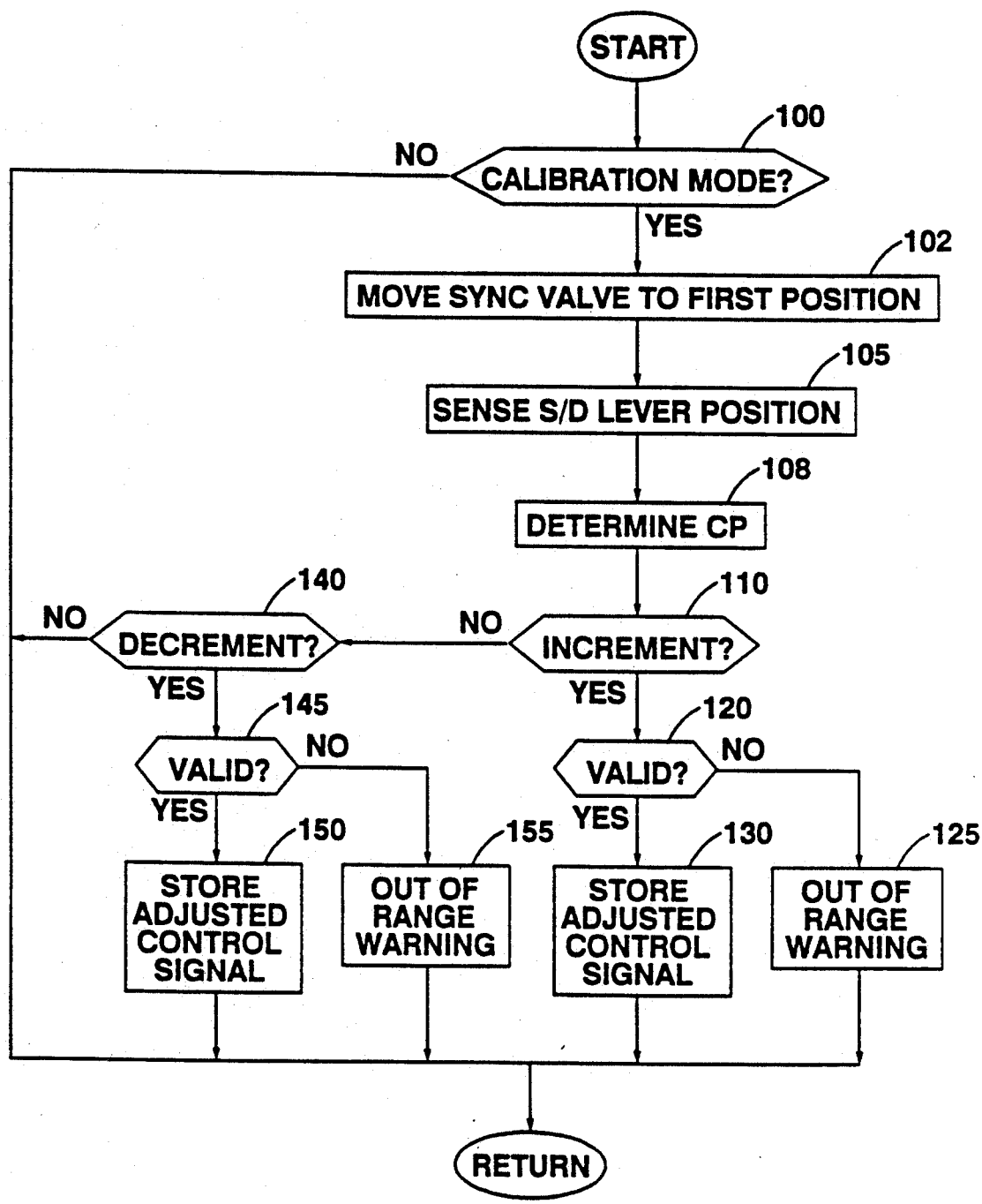
Fig_3_

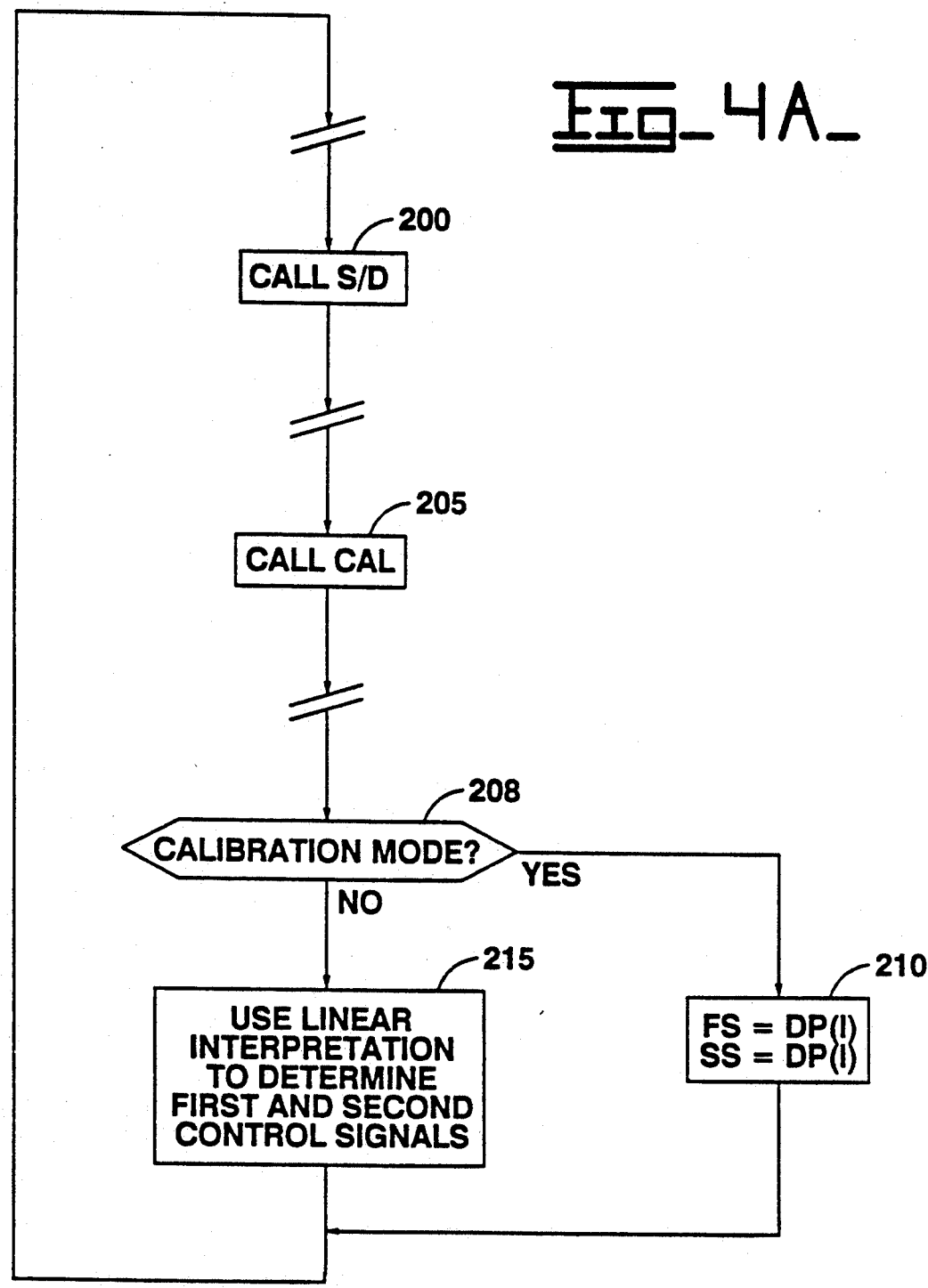

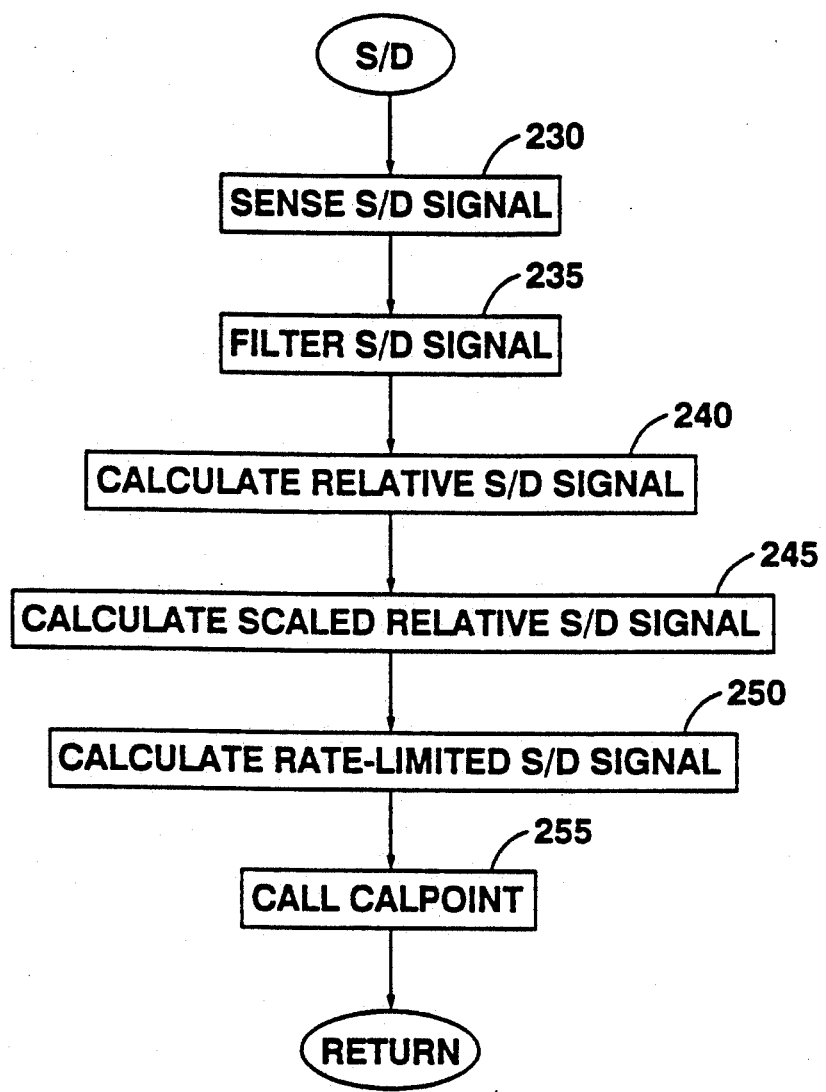
Fig_4B_

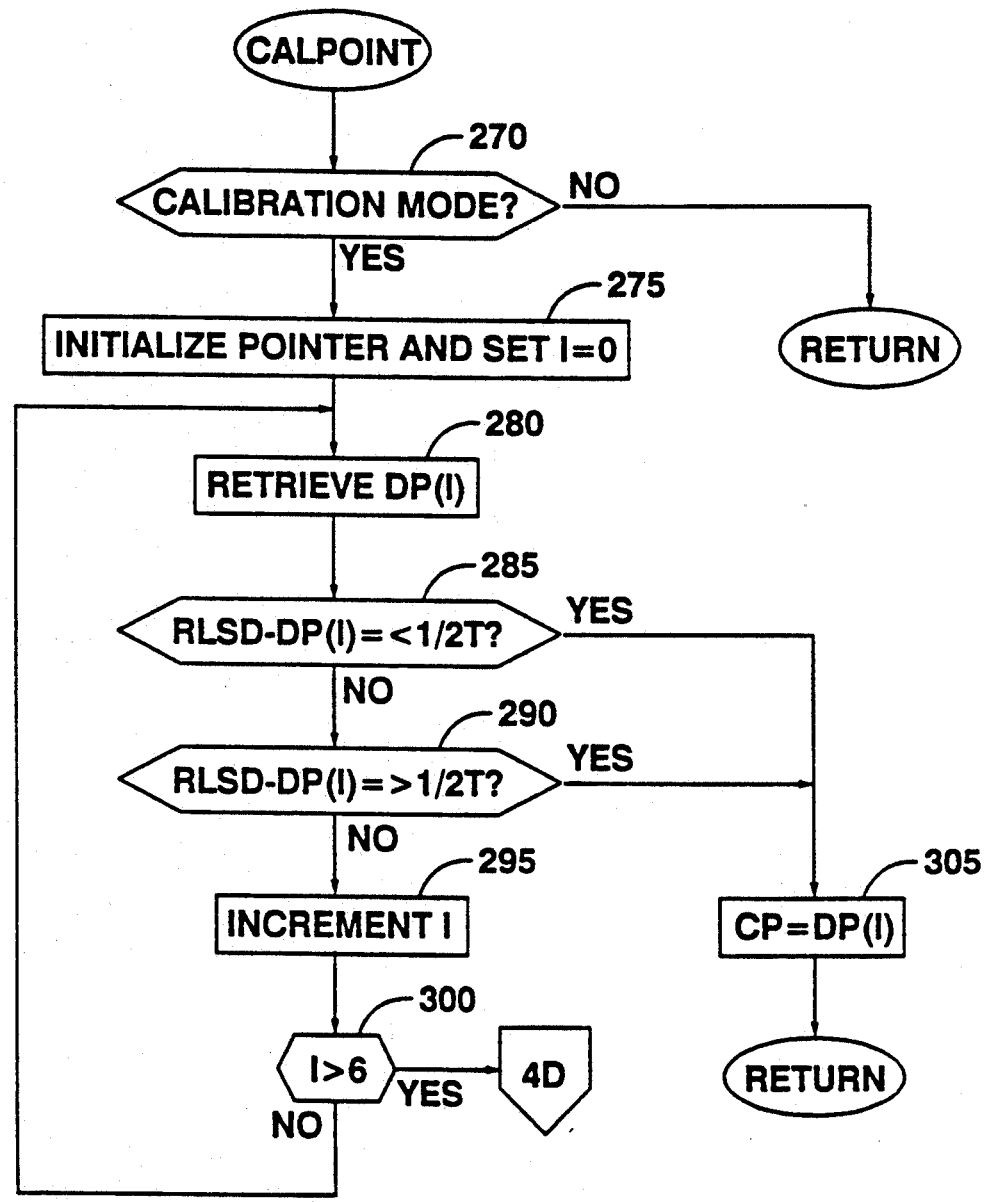
Fig_4C_

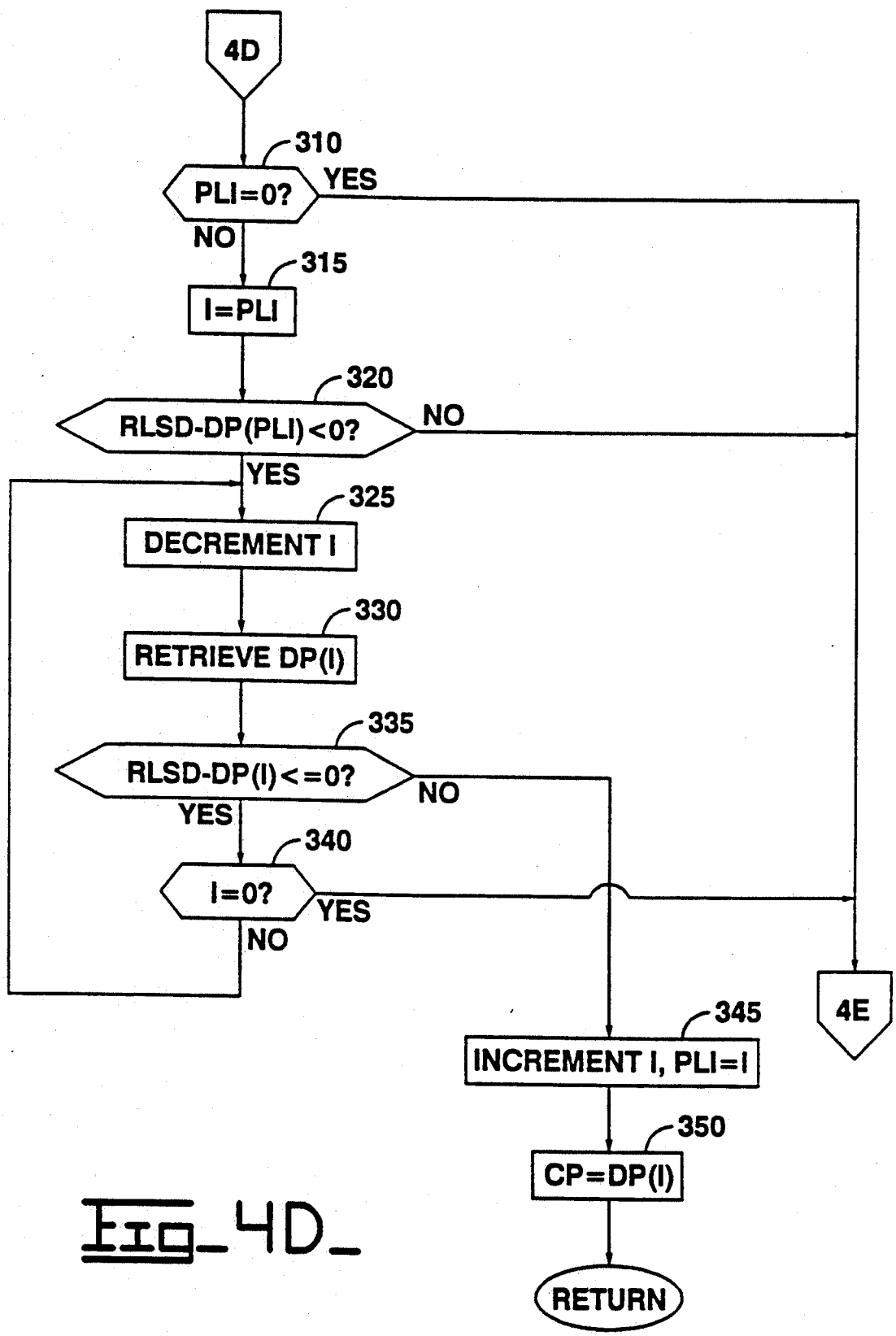
Fig_4D_

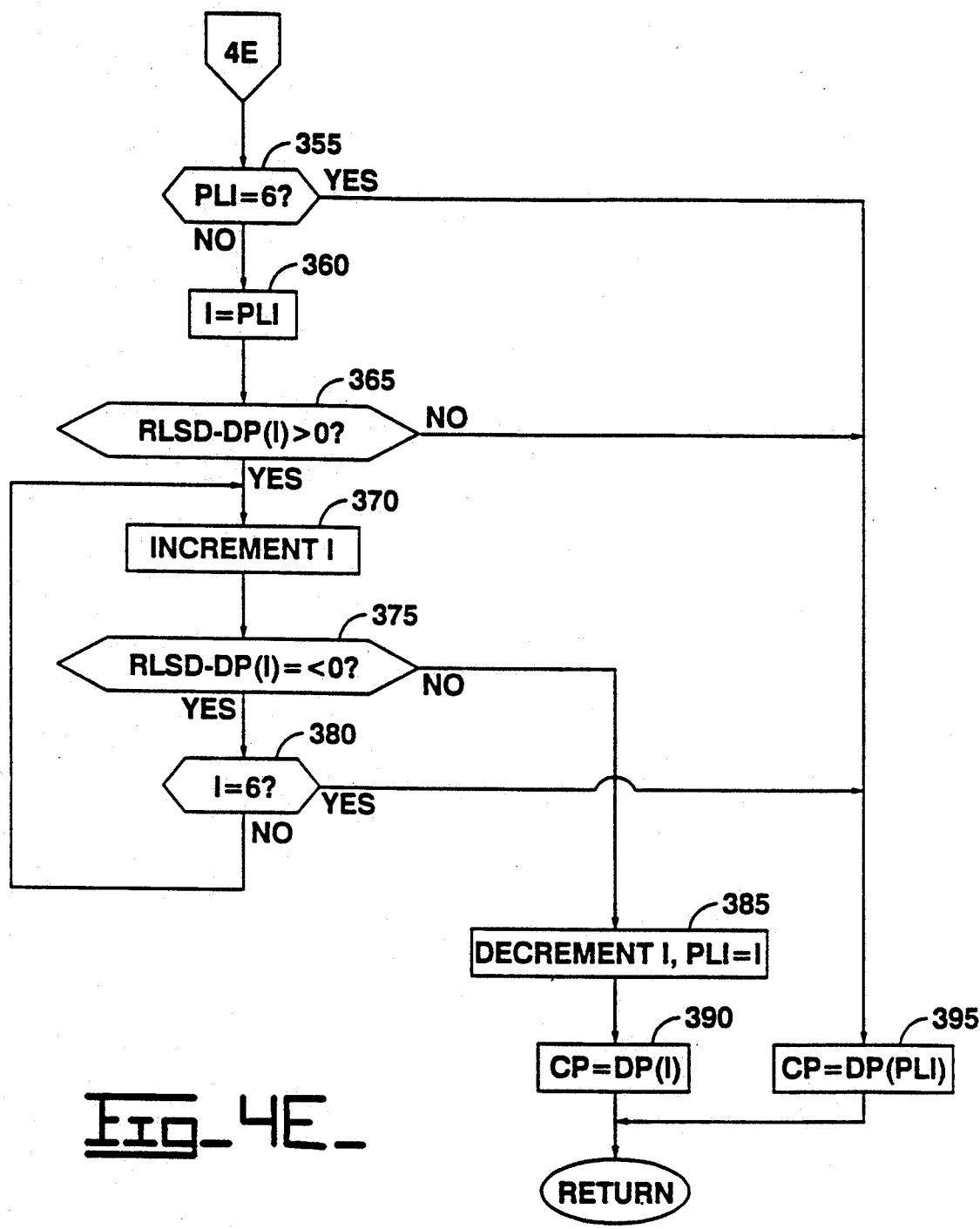
Fig_4E_

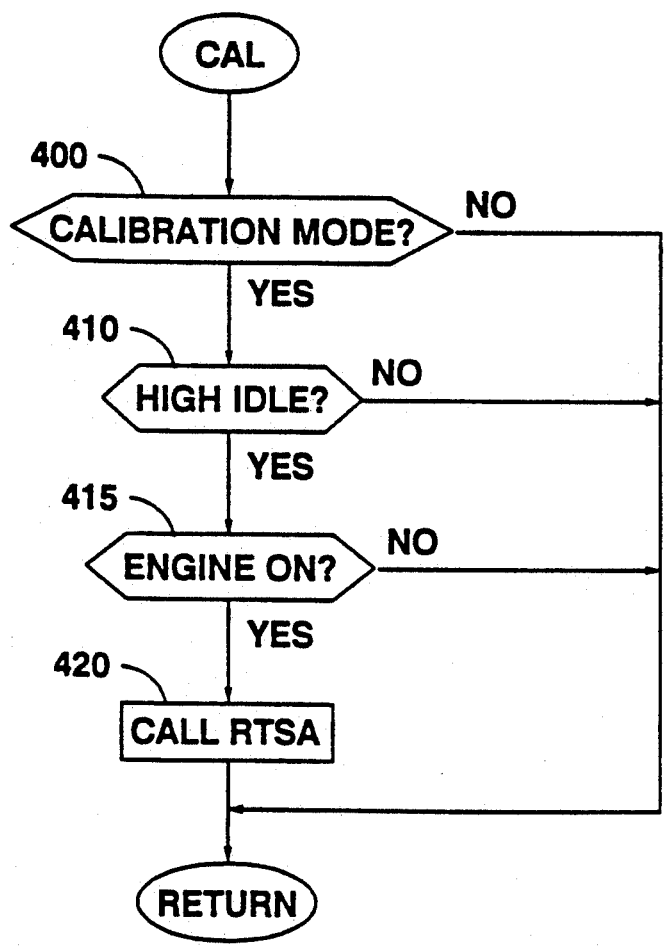
Fig_4F_

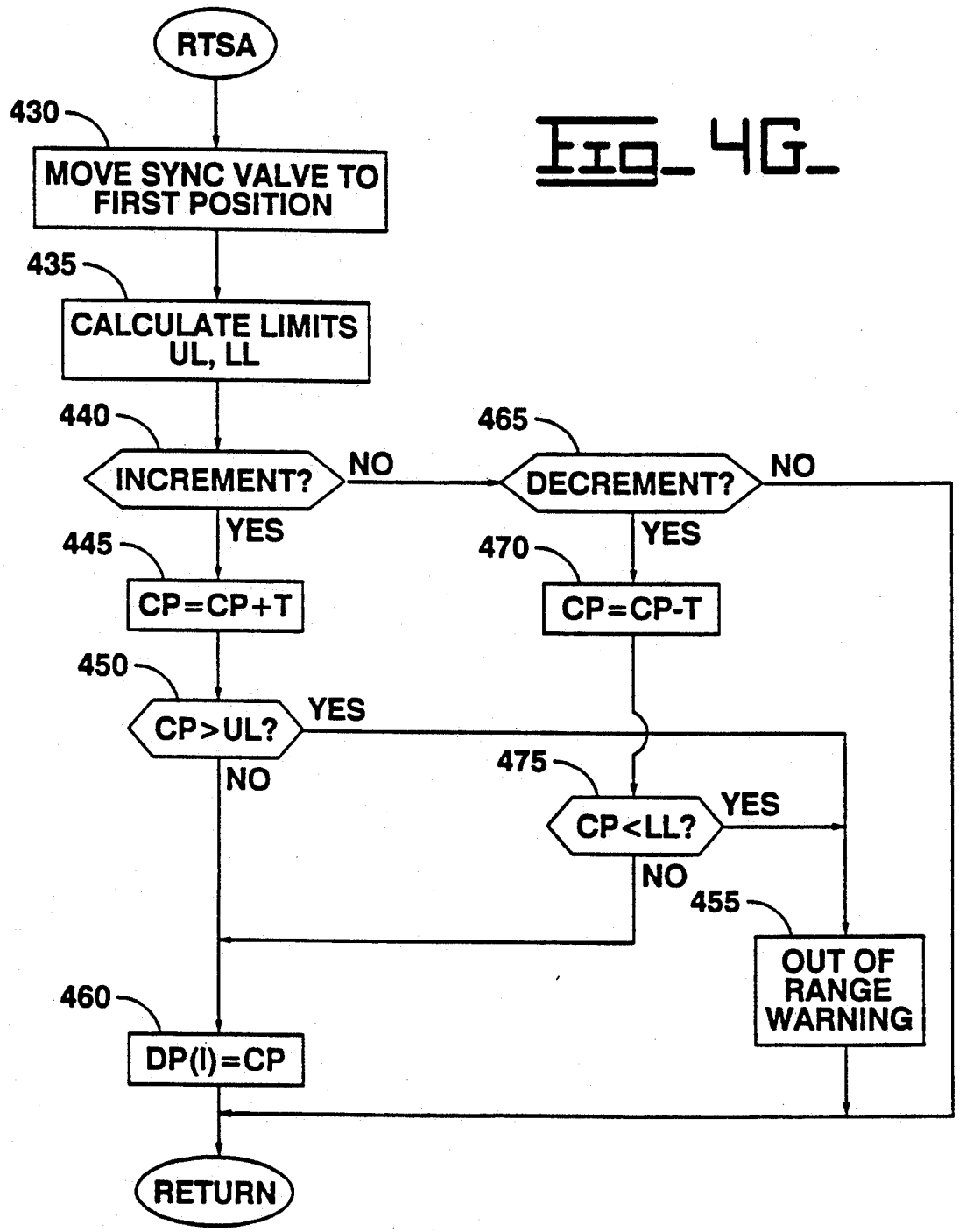
Fig_4G_

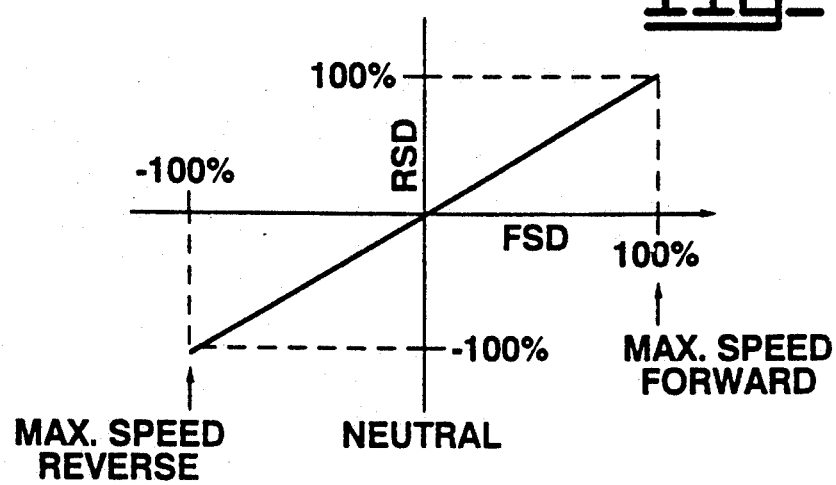
Fig_5A_
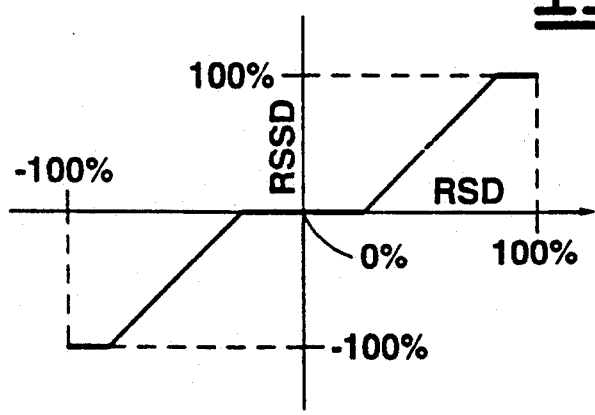
Fig_5B_
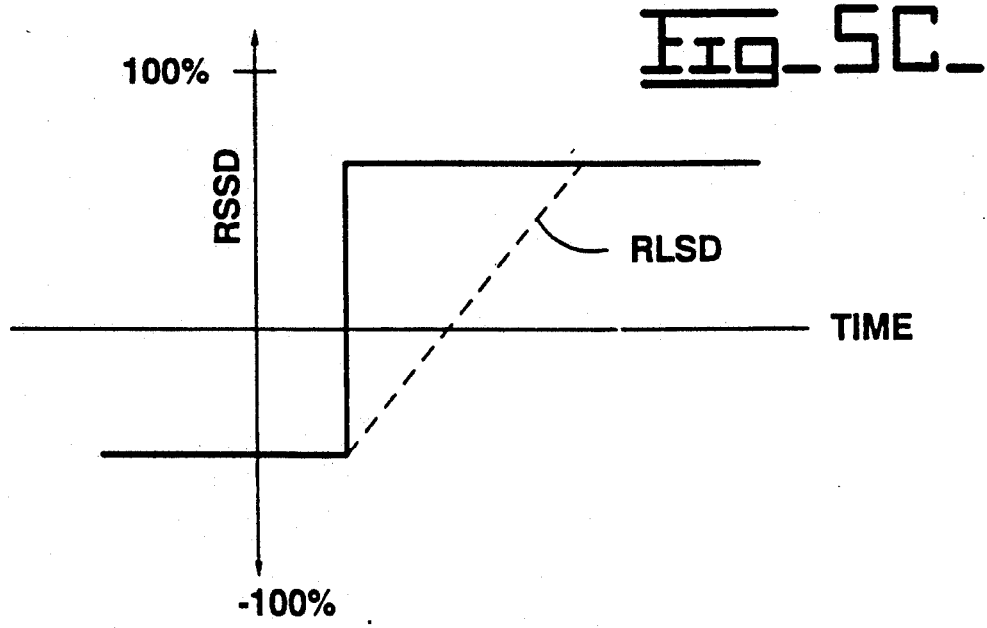
Fig_5C_

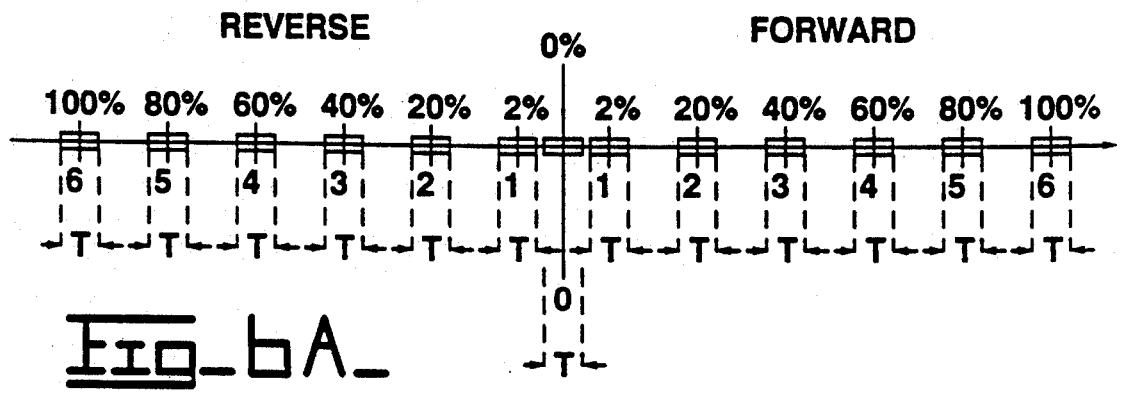
Fig_6A_
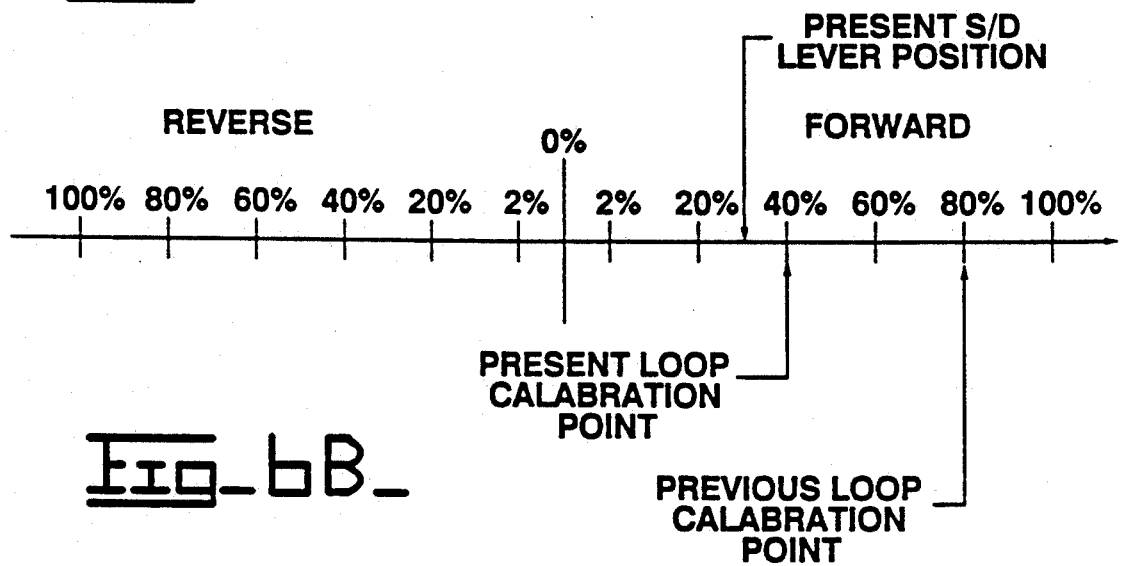
Fig_6B_
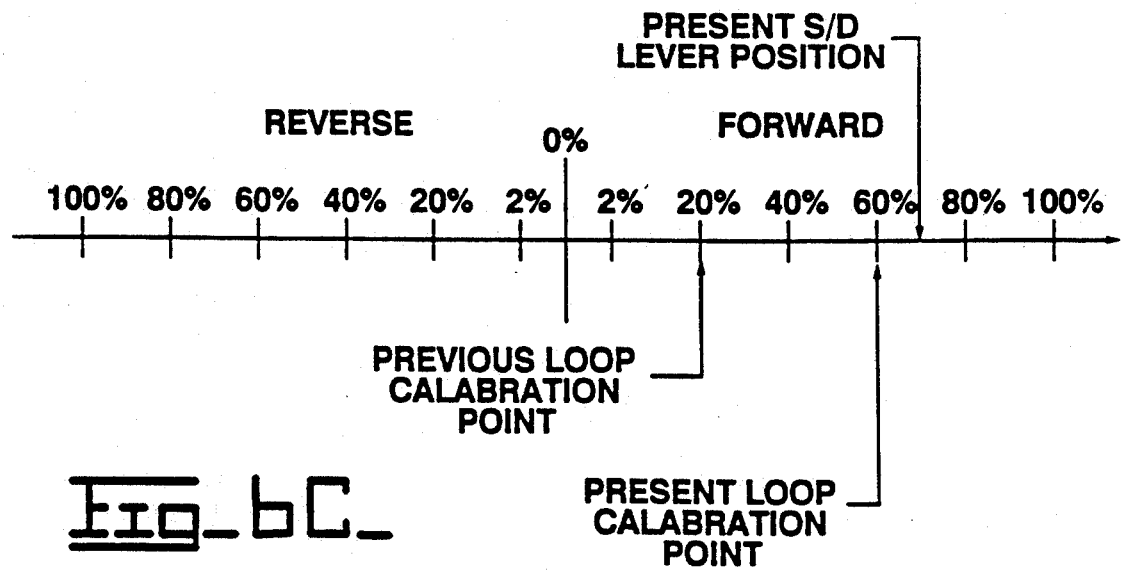
Fig_6C_

APPARATUS FOR CALIBRATING THE SPEED OF HYDROSTATICALLY DRIVEN TRACTION MOTORS

DESCRIPTION

1. Technical Field

The present invention relates generally to an electronic control for a hydrostatically driven vehicle and, more specifically, to an electronic control which permits synchronization of the speeds of individual fluid powered drive motors by updating stored data.

2. Background Art

In the operation of construction machinery, vehicles are employed which have separate hydrostatic transmissions driving individual ground engaging devices, such as tracks or wheels. Typically, each hydrostatic transmission includes a fluid pump driven by an engine. Displacement of the pump is controlled by a pump actuator in the form of a hydro-mechanical or electro-hydraulic control system. The fluid pump is connected to a respective drive motor through a closed loop hydraulic circuit, thereby providing pressurized fluid for driving the motor. Such systems are advantageous because of their ease of operation and maneuverability. However, they have the disadvantage of being subject to deviations during rectilinear movements due to differences between the separate hydraulic transmission systems. Specifically, differences in manufacturing tolerances and operating efficiencies of the hydraulic pumps and motors result in variances between the operating speeds of the individual drive tracks, thereby making it difficult to achieve rectilinear vehicle operation. Additionally, similar problems can result from fluid leakage in the hydraulic transmission systems.

In an attempt to correct the above-mentioned problems, systems have been developed which implement a cross-over or synchronizing valve interconnected between the hydrostatic transmissions for controllably permitting flow therebetween. Examples of systems incorporating synchronizing valves are shown in U.S. Pat. Nos. 4,077,484 which issued on Mar. 7, 1978 to Dexelan and 4,354,420 which issued on Oct. 19, 1982 to Bianchetta. Typically, the synchronizing valve is movable to first position during vehicle steering operations and a second position when rectilinear operation is desired. The first position blocks interflow of fluid between the circuits, whereas the second position permits interflow of hydraulic fluid between the hydraulic circuits for synchronizing the speeds of motors.

However, in past systems which employ synchronizing valves, smooth vehicle operation during steering is difficult due to the above-mentioned tolerance differences. For example, if the tolerance differences are such that the left transmission operates faster than the right transmission, it is possible for the vehicle to initially veer to the right at commencement of a left turn. Such a condition is obviously undesirable and, hence, it is desirable to provide a system for eliminating or reducing any speed differences between the separate transmissions. In existing systems, speed mismatch is typically corrected by adjusting the position of mechanical stops in the individual pumps and motors. However, such modifications are time intensive and result in undesirable and excessive vehicle downtime and such adjustments cannot adequately compensate for the effects of fluid leakage. Moreover, such modifications cannot affect a speed mismatch at less than maximum pump displacement. Additionally, it is difficult to assure rectilinear operation throughout the entire operating range if such mechanical adjustments are employed.

The present invention is directed to overcoming one or more of the problems as set forth above.

DISCLOSURE OF THE INVENTION

A drive system for a work vehicle is provided which includes an engine, first and second pumps driven by the engine and being responsive respectively to first and second control signals to provide pressurized fluid in proportion thereto. First and second fluid powered motors are connected respectively to the first and second pumps through closed loop hydraulic circuits. The hydraulic circuits are adapted to communicate pressurized fluid from the pumps to the motors for driving the motors. First and second ground engaging devices are connected to and powered by the first and second motors. A manually operable control element is movable between first and second limits for indicating a desired speed for the fluidly driven motors. A sensor is provided sensing the position of the control element and responsively producing a desired motor speed signal. A memory device is adapted to store data which relates the desired motor speed signal to the first and second control signals in a preselected manner. A processor is provided for receiving the desired speed signal, responsively retrieving at least a portion of the data from the memory device, and producing the first and second control signals in response to the retrieved data and the desired speed signal. An adjusting device is provided for receiving at least one of the control signals, permitting controllable adjustment of the control signal and responsively producing an adjusted control signal so as to vary the speed of a respective motor. An overwriting device is provided for receiving the adjusted control signal and overwriting a portion of the stored data in response to the adjusted control signal.

Also disclosed is an apparatus for synchronizing the speeds of separate drive motors in a hydrostatic drive arrangement of a work vehicle. The drive arrangement includes first and second fluid pumps driven by an engine and being responsive to a first and second control signals, respectively, to provide pressurized fluid in proportion thereto, and first and second reversible fluid powered motors. First and second closed loop hydraulic circuit interconnect the pumps and the motors for communicating pressurized fluid from the pumps to the motors for driving the motors. An electrohydraulic synchronizing (sync) valve is interconnected between the hydraulic circuits. The sync valve is normally biased to a first position at which interflow of fluid between the circuits is blocked, and is movable to a second position in response to a sync signal. The second position permits interflow of hydraulic fluid between the hydraulic circuits for synchronizing the speeds of the first and second motors. The apparatus includes a manually operable control element being movable between first and second limits for indicating a desired motor speed and direction for the fluidly driven motors. A sensor is provided for sensing the position of the control element and responsively producing a desired motor speed/direction signal. A memory device adapted to store data which relates the desired motor speed/direction signal to the first and second control signals in a preselected manner. A calibration switch is movable between a first and second positions and is adapted to produce a calibration signal when positioned at the second position. A processor is provided for receiving the desired speed/direction signal and the calibration signal, blocking production of the sync signal in response to the receiving the calibration signal, retrieving at least a portion of the data from the memory device, and processing the retrieved data and the desired speed/direction signal to produce the first and second signals. An adjusting device is provided for receiving at least one of the control signal's signal and permitting controllable adjustment of the magnitude of the received signal so as to vary the speed of a respective motor. An overwriting device is provided for receiving the adjusted control signal and overwriting a portion of the stored data in response to the adjusted control signal.

BRIEF DESCRIPTION OF THE DRAWINGS

FIG. 1 is a diagrammatic view of an electronic control for incorporating the present invention;

FIGS. 2A-B show a detailed hydraulic schematic of a typical hydraulic drive system which can be used with the present invention;

FIG. 3 is a flow chart illustrating the overall operation of a computer program for practicing the present invention;

FIGS. 4A-G are detailed flow charts which can be used in programming a processing device in accordance with the preferred embodiment of the present invention;

FIGS. 5A-C are graphs illustrating relationships between certain signals employed in the present invention; and FIGS. 6A-C are diagrams illustrating movement of a speed/direction lever.

BEST MODE FOR CARRYING OUT THE INVENTION

Referring now to the drawings, and in particular FIGS. 1 and 2A-B, the present invention is shown embodied in an electro-hydraulic control system for synchronizing and adjusting the speeds of a first and second fluid-powered motors 12a,b.

While the invention is adaptable to other usages, the present invention was developed for use with a hydrostatic drive system 200 for use in a tracked vehicle, such as a track loader or bulldozer. In that working context, the first motor 12a drives a crawler track 16a at the left side of the vehicle and the second motor 12b drives a crawler track 16b at the right side of the vehicle. These directional terms should be understood to be for purposes of illustration only and should not be considered to be limitation of the invention.

An electronic control 20 for practicing the present invention is schematically illustrated in FIG. 1 for use in connection with the hydraulic drive system 200 of FIGS. 2A-B. The electronic control 20 includes a processor means 22 which is preferably implemented employing a microprocessor 24 with appropriate input and output signal conditioning circuits (not shown) as is well known in the art. The microprocessor 24 is programmed to control solenoid actuated valves in the hydraulic drive system 200 in response to sensed input parameters, as is explained below. Preferably the microprocessor 24 is a series M6800 microprocessor as manufactured by Motorola Semiconductor Products, Inc. of Austin, Tex.; however, numerous other commercially available devices could readily be adapted to perform the functions of the processor means 20.

A first position sensor 26a is provided for sensing the position of a left steering pedal 28a and responsively producing a left steering signal which is delivered to the microprocessor 24 via an electrical conductor 30. Similarly, a second pedal sensor 26b is provided for sensing the position of a right steering pedal 28b and responsively producing a right steering signal which is delivered to the microprocessor 24 via an electrical conductor 31. Preferably, the first and second sensors 26a,b are in the form of rotary potentiometers which produce output signals responsive to the degree of activation of a respective steering pedal 28a,b. Such sensors are well known in the art and will not be explained in detail herein. A suitable sensor is disclosed U.S. Pat. No. 4,915,075 which issued to Brown and is assigned to the assignee herein.

A manually operable control lever 32 is movable between first and second limits L1,L2 for indicating a desired speed and direction for the fluidly driven motors 12a,b. The first limit L1 indicates full-speed forward, the second position L2 indicates full-speed reverse, and a position intermediate the first and second limits indicates neutral N. The control lever 32 will hereinafter be referred to as the speed/direction (S/D) lever. The S/D lever 32 is provided with a scale (see FIG. 6A) for indicating when the lever is at zero percent (i.e. neutral), two percent, twenty percent, forty percent, sixty percent, eighty percent and one hundred percent of maximum motor speed in both the forward and reverse directions. Preferably, the S/D lever 32 is infinitely variable between the first and second positions L1,L2; however, in some instances it might be desirable to provide a S/D lever having preselected detent positions. For example, the S/D lever 32 could have detents at each of the above-mentioned percentage points.

A third sensor 34 is provided for sensing the position of the S/D lever 32 and responsively producing a desired motor speed/direction signal. The desired speed/direction signal is communicated to the microprocessor 24 via an electrical conductor 36. It should be apparent that the function of the speed/direction lever 32 could be performed by other devices without departing from the scope of the invention. For example, two levers could be provided for respectively indicating a desired speed and a desired direction.

An engine speed sensor 40 is provided for sensing the rotational speed of an engine driven member, such as a flywheel 42, and responsively producing an engine speed signal. The engine speed signal is delivered to the microprocessor 24 via an electrical conductor 44. The engine speed sensor 40 can be any type of sensor that accurately produces an electrical signal in response to the engine speed. Such sensors are well-known in the art; hence, further detail will not be provided herein.

A throttle lever 48 is provided for indicating a desired engine speed which is communicated to an engine controller (not shown) for controlling the speed of the vehicle engine 50 (see FIGS. 2A-B) in a manner well known in the art. Engine speed regulation forms no part of the present invention; hence, the engine controller is not discussed herein. The throttle lever 48 is variably movable between first and second limits LI, HI which indicate low and high idle, respectively. The electronic control 20 is equipped for a first switch 52 which is adapted to produce a high idle signal when the throttle lever 48 is at the second limit, HI. The first switch 52 delivers the high idle signal HI to the microprocessor 24 via a conductor 54.

A two-position calibration switch 58 is provided for indicating that an operator desires to calibrate the speeds of the first and second motors 12a,b. When the calibration switch 58 is at a first or "OFF" position, calibration is disabled. Conversely, when the switch is moved to a second or "ON" position, a calibration signal is delivered to the microprocessor 24 via a conductor 60 for indicating that motor speed calibration is desired.

Also provided is a three-position adjusting switch 62 which enables an operator to incrementally adjust the speed of at least one of the motors 12a,b, as explained below. The adjusting switch 62 is normally biased to a center position "C" and is manually movable to increment and decrement positions "I," "D." When the adjusting switch 62 is at the increment position "I," an increment signal is delivered to the microprocessor 24 via a conductor 64. Conversely, when the adjusting switch 62 is at the decrement position "D," a decrement signal is delivered to the microprocessor 24 via the conductor 64.

The electronic control 20 is equipped with a memory device 70 which is accessed by the microprocessor 24 in a manner well known in the art. Preferably the memory device 70 includes a random access memory (RAM) 72, a read only memory (ROM) 74 and an electronically erasable programmable read only memory (EEPROM) 76. The EEPROM 76 is adapted to store data which relates the desired motor speed/direction signal to the first and second control signals in a preselected manner.

The microprocessor 24 is programmed to receive the desired speed signal, responsively retrieve at least a portion of the data from the memory device 70, and produce the first and second control signals in response to the retrieved data and the desired speed signal, as explained below.

The first and second signals are delivered to first and second solenoid actuated control valves 80a,b in the hydraulic system 200 for controlling the speed and direction of the first and second motors 12a,b, respectively. The first and second valves 80a,b are three position proportional valves, each having a forward (F), reverse (R) and neutral (N) position. The control valves 80 are adapted to receive a charge pressure from a charge pump 215 (see FIGS. 2A-B) and deliver a control pressure responsive to the magnitude of the first and second signals, as explained below.

Each of the control valves 80a,b includes a forward solenoid 82a,b and a reverse solenoid 84a,b for controlling the direction and displacement of a respective valve. Hence, the first and second signals each consist of forward and reverse signals which are delivered to respective forward and reverse solenoids 82, 84. The first (left) forward control signal is communicated from the microprocessor 24 to the first (left) forward solenoid 82a via a conductor 86. The first (left) reverse control signal is communicated from the microprocessor 24 to the first (left) reverse solenoid 84a via a conductor 87. The second (right) forward control signal is communicated from the microprocessor 24 to the second (right) forward solenoid 82b via a conductor 88. The second (right) reverse control signal is communicated from the microprocessor 24 to the second (right) reverse solenoid 84b via a conductor 89.

The processor 24 is programmed to controllably deliver one of the forward or reverse control signals to each of the valves 80a,b to effect vehicle operation in accordance with the steering and S/D signals. The magnitude of the control signal in turn controls the degree of displacement of the control valve 80a,b and hence the speed of a respective motor 12a,b. If neither solenoid 82, 84 of a valve 80 is actuated, the valve 80 is biased to the neutral position (N), thereby stopping the flow of pressurized hydraulic fluid to the motor 12.

For purposes of producing the control signals, the EEPROM 76 contains first and second data tables which having data stored therein for relating the desired S/D signal to the first and second control signals in a preselected manner. In the preferred embodiment, the first and second data tables are further divided into respective forward and reverse data tables. Each of the four data tables has an equal number of discrete data elements for relating the desired motor speed signal to a respective one of the first forward, first reverse, second forward and second reverse control signals respectively. More specifically, each data table contains seven discrete data points (i.e. control signal values) which correspond respectively to zero percent, two percent, twenty percent, forty percent, sixty percent, eighty percent and one hundred percent of the respective maximum speed. The first and second signals have electrical currents which vary between a minimum corresponding to the zero percent data point and a maximum corresponding to the 100 percent data point. The remaining data points correspond to the magnitude of the current at a respective percentage of the maximum speed. Control signal currents for speeds which are between the discrete data points are calculated using linear interpretation, as would be understood by one skilled in the art.

If the desired S/D signal indicates forward operation, the processor 24 retrieves at least a portion of the discrete data points from the first and second forward data tables and uses linear interpolation to determine the exact value for the first and second control signals. Conversely, if the S/D signal indicates reverse motor operation, the processor 24 retrieves at least a portion of the data points from the reverse data tables to calculate the first and second signals. During normal vehicle operation, the control signals are modified in accordance with the steering signals from the left and right steering pedals 28a,b, as would be apparent to one skilled in the art. However, during the calibration mode, the vehicle is only allowed to operate at discrete speeds corresponding to the discrete data points, as is explained below.

The electronic control also includes an electrohydraulic synchronizing (sync) valve 94 which is adapted to receive a sync signal from the microprocessor 24 via a conductor 96. Operation of the sync valve 94 will be explained below in connection with FIGS. 2A-B.

The electronic control further includes a warning indicator. The indicator 98 can take numerous forms such as an LCD display or a warning light which can be controllably energized. The warning indicator 98 is provided to alert a vehicle operator to invalid motor speed adjustments, as is explained below.

Referring now to FIGS. 2A-B, a detailed hydraulic schematic of a the hydraulic drive system 200 which can be used with the present invention will be discussed. The drive system 200 includes a pump system 205 which is adapted to provided pressurized fluid to first and second drive motor systems 210a,b through a closed loop hydraulic system. The pump and motor systems 205, 210a,b are commercially available from Linde Hydraulic of Canfield, Ohio. These systems are available in a variety of drive capacities and the particular systems utilized are selected in accordance with desired vehicle performance characteristics. In the preferred embodiment, the drive system 200 is used on a model 943B track type loader which is manufactured by the assignee herein. On this particular vehicle, the preferred pump and drive systems 205, 210 are models BPV-50D and BMV-I140, respectively.

A charge pump 215 is connected to an output shaft 220 of the engine 50 for rotation therewith. The charge pump 215 is adapted to provide pressurized fluid to the pump and drive systems 205, 210$a,b$ as would be apparent to one skilled in the art. Inasmuch as charge pumps are well known in the art, no further description will be provided.

The pump system 205 includes first and second pump units 225$a,b$ for controllably providing pressurized fluid to the first and second drive motor systems 210$a,b$, respectively. The pump units 225$a,b$ are identical, hence only the first pump unit 225$a$ will be described herein. The pump unit 225$a$ includes a pump controller 228$a$ which is adapted to receive a pump control pressure from the control valve 80$a$ and responsively adjust the direction and displacement of a fluid pump 230$a$. The fluid pump 230$a$ is coupled to an output shaft 220 of the engine 50 for rotation therewith. The pump 230$a$ is a reversible variable displacement pump having a swash plate 235$a$ for controlling the direction and displacement of the pump 230$a$ as is common in the art.

The control valve 80$a$ is adapted to receive charge pressure from the charge pump 215 via a fluid conduit 238 and deliver the pump control pressure to the pump controller 228$a$ in response to the magnitude of the control signal produced by the microprocessor 24. The pump controller 228$a$ receives the pump control pressure and adjusts the position of the swash plate 235$a$ in response to the control pressure. For this purpose, the pump controller 228$a$ includes a hydromechanical servo valve 240$a$ in fluid communication with the control valve 80$a$ and for receiving the pump control pressure. When a forward control signal is applied to the forward solenoid 82$a$, a control pressure proportional to the forward signal is communicated to the servo valve 240$a$ via a forward fluid conduit 241$a$. Similarly, when a reverse control signal is applied to the reverse solenoid 84$a$, a control pressure proportional to the reverse control signal is communicated to the servo valve 240 via a reverse fluid conduit 242$a$.

The servo valve 240$a$ is mechanically coupled to a three-position hydromechanical valve 245$a$ having a mechanical feedback means 250$a$. The valve 245$a$ is normally positioned at a neutral position (N) and is movable to forward (F) and reverse (R) positions by the servo valve 240$a$. The hydromechanical valve 245$a$ is fluidly coupled to the fluid conduit 238 for receiving the charge pressure. The valve 245$a$ delivers the charge pressure to a swash plate actuator 255$a$ to move the swash plate 235$a$ in a direction and to a displacement responsive to the control signal applied to the control valve 80$a$.

More specifically, movement of the servo valve 240$a$ mechanically shifts the position of the hydromechanical valve 245$a$ to either the forward or reverse positions F,R. This in turn causes charge pressure to be delivered to the swash plate actuator 255$a$ in a direction corresponding to the position of the valve 245$a$. When the swash plate 235$a$ reaches the desired position, as indicated by the pump control pressure, the mechanical feedback means 250$a$ moves the hydromechanical valve 245$a$ to the neutral position (N), thereby stopping flow of the charge pressure to the swash plate actuator 255$a$.

The pump 225$a$ has forward and reverse ports 260$a$, 263$a$ which are connected to respective forward and reverse ports 265$a$, 268$a$ on the first motor 12$a$ by fluid conduits 270$a$, 275$a$, respectively. Since the first and second motor systems 210$a,b$ are identical, only the first motor system 210$a$ will be explained. The motor system 210$a$ includes a pilot actuated purge valve 280$a$ connected between the fluid conduits 270$a$, 275$a$ for connecting the motor port 265$a$, 268$a$ of lower pressure to tank. A relief valve 285$a$ is connected between the purge valve 280$a$ and system tank for preventing operation of the purge valve 280$a$ below a preselected pressure, as would be apparent to one skilled in the art.

The first motor system 210$a$ further includes a drive motor servovalve 305$a$ for controlling displacement of the fluid motor 12$a$. The motor servovalve 305$a$ is fluidly coupled to the conduit 238 for receiving the charge pressure. The servovalve 305$a$ is also fluidly coupled to a check valve 310$a$ via a fluid conduit 312$a$ for receiving a pilot pressure which is proportional to the pump control pressure. The latter function is accomplished by connecting the check valve 310$a$ between control valve 80 and the servo valve 240$a$. The servovalve 305$a$ delivers a motor control pressure to a pump actuator 315$a$ which mechanically adjusts the motor displacement in response to the received pressure, as would be apparent to one skilled in the art.

The sync valve 94 is connected between the first and second pump units 225$a,b$ and is adapted to controllably connect and disconnect the pump units 225$a,b$ to control fluid flow therebetween. More specifically, the sync valve 94 has first and second forward ports 330$a,b$ which are connected to the first and second forward fluid conduits 270$a,b$. The sync valve 94 also has first and second reverse ports 335$a,b$ which are connected to the first and second reverse fluid conduits 272$a,b$. The sync valve 94 is normally biased to a first position, as shown, at which communication between the first and second pump units 225$a,b$ is blocked. The sync valve 94 is movable to a second position in response to a sync signal which is produced by the microprocessor 24. When the sync valve 94 is at the second position, interflow of hydraulic fluid between the first and second pump units 225$a,b$ is permitted, thereby synchronizing the speeds of the first and second motors 12$a,b$.

During normal vehicle operation, the microprocessor 24 is programmed to deliver the sync signal when rectilinear vehicle travel is desired. If steering operations are desired, as indicated by the presence of left or right steering signals, the sync signal is not produced and, hence, the sync valve 94 is positioned at the first position. The microprocessor 24 is also programmed to execute a calibration routine in response to receiving the calibration signal. The calibration routine will be explained in detail below. During the calibration routine, the vehicle is caused to operate at one of the discrete speeds, without any input from the steering pedals 28$a,b$ and with the sync valve 94 in the first position. With the sync valve 94 in the first position, any speed differences between the first and second motors 12$a,b$ is manifested by a deviation from rectilinear travel.

Referring now to FIG. 3, a flow chart illustrating the overall operation of a computer program for practicing the present invention will be discussed. FIG. 3 is a general illustration of a calibration subroutine which is executed from a MAIN control program (FIG. 4A).

Initially, in the block 100, the processor 24 determines if the calibration mode is requested as indicated by the presence of a calibration signal. If the calibration signal is not detected, control is returned to the MAIN program. However, if the calibration signal is detected, control is passed to the block 102 where the sync valve 94 is moved to the first position. This causes any speed differences between the motors 12a,b to be manifested by a deviation of vehicle from a rectilinear direction of travel.

Control is then passed to the block 105 where the processor 24 determines the position of the S/D lever 32 as indicated by the S/D signal. Next, in the block 108, the processor 24 determines a calibration point CP from the S/D signal. More specifically, a subroutine is provided for selecting a calibration point CP which corresponds to one of the above-described discrete forward or reverse speed settings. This subroutine is explained in greater detail below. It should be apparent that this subroutine would not be required if the S/D lever 32 were equipped with detent speed settings. The calibration routine retrieves the appropriate discrete data point from either the forward or reverse data table of the second (right) data table and sets the calibration point CP equal to the retrieved data point. The present invention only permits adjustment of the second (right) motor's speed; however, it is within the scope of the present invention to permit adjustment of the speed of both motors 12a,b.

After the calibration point CP is determined, control is passed to the block 110. In the block 110 the processor 24 senses for the presence of an increment signal from the adjusting switch 62. If an increment signal is detected, the magnitude of the second control signal will be adjusted by a preselected amount provided that the adjusted control signal is within a preselected range. This function is performed in the block 120 which checks the value of the adjusted control signal to determine if it falls within the preselected range. This check is provided to limit the amount that the second data table, and hence the speed of the right motor 12b, can be changed.

If the adjusted control signal is outside of the preselected range, control is passed to the block 125, causing an out of range warning to be issued to the warning indicator 98. Conversely, if the adjusted control signal is valid, control is passed to the block 130, causing the old discrete value stored in the EEPROM 76 to be overwritten with the adjusted control signal. For example, if the calibration point corresponds to the 20 percent data point, the old value 20 percent data point will be overwritten with the value of the adjusted control. Similar process steps are performed in the blocks 140-155 if a decrement in the motor speed is requested. Preferably, the above-described process is repeated for each discrete data point in both the forward and reverse data tables.

FIGS. 4A to 4G are a detailed flowchart illustrating a computer software program for implementing the preferred embodiment of the present invention. The program depicted in this flowchart is particularly well adapted for use with the microprocessor 24 and associated components described above, although any suitable microprocessor may be utilized in practicing an embodiment of the present invention. This flowchart constitutes a complete and workable design of the preferred software program, and has been reduced to practice on the series MC6800 microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

FIG. 4A illustrates a relevant portion MAIN program. The MAIN program is repeatedly executed at a predetermined rate, which is once every 30.72 microseconds in the preferred embodiment. The MAIN program performs calls to numerous subroutines and executes high level program steps for controlling the vehicle, as would be apparent to one skilled in the art. Initially, in the block 200, the MAIN program calls an S/D subroutine. The S/D subroutine functions to sense the position of the S/D lever and determine the calibration point CP in accordance with the sensed S/D lever position. The S/D subroutine is contained on FIGS. 4B-E which will be explained in greater detail below.

Next, control is passed to the block 205, where the MAIN program calls a CAL subroutine. The CAL subroutine allows the operator to selectively increment or decrement the speed of the right drive motor 12b when the vehicle is operating in the calibration mode. The CAL subroutine is contained in FIGS. 4F-G which will be explained in greater detail below.

Control is then passed to the block 208, where it is determined if the vehicle is operating in the calibration mode by checking the calibration switch 58. If the vehicle is operating in the calibration mode, the first and second control signals are set to values determined in the CAL subroutine. This causes both motors 12a,b to operate at the discrete speed corresponding to the selected calibration point CP.

Conversely, if the vehicle is not in the calibration mode, control is passed to the block 215. The block 215 represents a separate subroutine which is provided for producing the first and second control signals when the vehicle is not in the calibration mode. Since this is not an aspect of the present invention, this subroutine is not illustrated in detail and will only be briefly described herein. This subroutine retrieves at least a portion of the data points from the first and second data table. These data points and the desired motor S/D signal are processed using linear interpretation to determine the values for the first and second control signals, as would be understood by one skilled in the art. The subroutine further modifies the control signals in accordance with the left and right steering signals to achieve the desired steering operation. For example, if the left steering pedal 28a is depressed, indicating that a left turn is desired, the magnitude of the first control signal is reduced to lower the speed of the first (left) motor 12a. The amount the first motor speed is decreased is controlled by the distance the steering pedal 28a is depressed. Even more rapid turning is effected by reversing the direction of the motor on inside of the turn.

Referring now to FIGS. 4B-E, the S/D subroutine will be discussed in detail. Initially, in the block 230, the position of the S/D lever 32 is sensed by detecting the magnitude of the S/D signal. Control is then passed to block 235 where a filtered S/D signal (SDF) is produced using a low-pass software filter, as is well known in the art. Control is then passed to the block 240 where a relative S/D signal (RSD) is calculated from the filtered S/D signal. The relationship between the filtered S/D signal and the relative S/D signal is illustrated in FIG. 5A.

Control is then passed to the block 245 where a scaled relative S/D signal (RSSD) is produced in response to the relative S/D signal (RSD). The relationship between these two signals is illustrated in FIG. 5B. The function of the scaled relative S/D signal (RSSD) is to provide deadbands at the first, second and neutral positions of the S/D lever 32. These positions correspond respectively to the 100 percent forward, 100 percent reverse and zero percent values of the relative S/D lever signal.

Subsequently, control is passed to the block 250 where the value of the scaled relative S/D signal (RSSD) is rate limited, as is illustrated in FIG. 5C, to produce a rate limited S/D signal (RLSD). Rate limiting functions are well known in the art, and hence, will not be described in detail herein.

Finally control is passed to the block 255, causing a CALPOINT subroutine to be called. The CALPOINT subroutine is illustrated in FIGS. 4C-F. The function of the CALPOINT subroutine determine a calibration point CP from the rate limited S/D signal (RLSD) when the control is in the calibration mode.

Initially, in the block 270 the control determines if the calibration mode is requested by checking for the presence of a calibration signal. If no calibration signal is detected, control is passed to the MAIN program. Conversely, if the calibration signal is detected, control is passed to the block 275.

In the block 275 a software pointer is initialized to indicate the direction of travel in response to the rate-limited S/D signal. More specifically, if the rate-limited S/D signal indicates reverse travel, data will be retrieved from the second reverse data table. Conversely, if forward travel is indicated, data points will be retrieved from the second forward data table. An index (I) is also set to zero in the block 275.

Control is then passed to the block 280 where the data point stored at the present value of the index I is retrieved. The seven data points are stored in ascending order in the data tables. Hence, DP(0) corresponds to the zero data point, and DP(6) corresponds to the 100 percent data point. In the blocks 280-305, it is determined if the S/D lever 32 is within a deadband region T (see FIG. 6A) of any of the discrete speed settings. If it is, the calibration point CP is set to the value of the corresponding data point DP(I) in the block 305. For this purpose, the control checks to see if the rate-limited S/D signal is within one-half of the deadband region T on either side of the retrieved data point DP(I). This function is performed in the blocks 285 and 290. If it is not, control is passed to the block 295 where the pointer I is incremented. Control is then passed to the block 300, where it is determined if all of the data points have been checked. If the index is greater than 6 all of the data points have been checked and control is passed to the block 310.

Otherwise, control is returned to the block 280, where the next data point DP(I) is retrieved. This process is repeated until one of the checks in the blocks 285 and 290 is answered "YES" or until all of the data points have been retrieved and checked. If the rate limited S/D signal is not within the deadband regions T, control is passed to the block 310.

The blocks 310-350 function to select a calibration point when the S/D lever 32 is not in a deadband region and its position has been decreased, i.e, moved towards the zero percent setting since the last processing loop. If the lever position is decreasing and the lever 32 is not in one of the deadbands regions T, the calibration point CP is set to the next higher discrete data point above the current lever position. This can better be understood by referring to FIG. 6B. For example, assume the calibration point was the 80 percent speed setting during the previous loop. However, the lever has since been moved to a position between the 20 percent and 40 percent settings. The blocks 310 to 350 will function to set the calibration point equal to the 40 percent speed setting. Other strategies for addressing this situation are conceivable; however, the selected strategy minimizes abrupt changes in vehicle speeds during the calibration mode.

The programming steps for implementing the above-described strategy will now be described. Initially in the block 310, a previous loop index PLI is checked to determine if the S/D lever 32 was previously positioned in the zero percent position. If it was, the blocks 315-350 are skipped and control is passed to the block 370. If the test in block 310 is answered "NO", control is passed to the block 315 where the index I is set to the value of the previous loop index PLI.

Control is then passed to the block 320 where it is determined if the S/D lever 32 has been moved to a lower speed setting than it was during the previous loop. This is determined by checking if the rate limited speed direction signal (RLSD) is smaller than the calibration point CP from the previous loop. If it is not, the blocks 325-350 are skipped and control is passed to the block 360. However, if the control lever 32 setting has been decreased, control is passed to the block 325 where the index I is decremented.

The discrete data point number I is then retrieved in the block 330. Control is then passed to the block 335 where it is determined if the retrieved data point is larger than the rate-limited S/D signal. If it is, control is passed to the decision block 340 where it is determined if the index I is equal to zero. If the index I equals zero, all of the data points have been checked and control is passed to the block 355. Conversely, if the index I is not equal to zero, control is returned to the block 325 and the previous steps are repeated for the next discrete data point.

This process is repeated until all of the discrete data points have been retrieved and checked or until the test in the block 335 is answered "No." If the test in the decision block 335 is answered "NO", control is passed to the block 345. In the block 345 where the index I is incremented and the previous loop index is set to the value of the index I. At this point, both indexes I, PLI correspond to the discrete speed setting which is immediately higher than the current position of the S/D lever 32. Control is then passed to the block 350 where the calibration point CP is equated to data point number I. Control is then returned to the MAIN program for further processing.

If a calibration point is not selected in the blocks 310-350, control is passed to the block 355. In the block 355, the previous loop index PLI is examined to determine if the control handle was previously positioned in the 100 percent setting. If it was, control is passed to the block 395 which causes the calibration point to be set to the same value as it was in the previous loop, which in this case is the 100 percent data point.

Otherwise, control is passed to the block 360 where the index I is set to the value of the previous loop index PLI. Control is then passed to the block 365. The blocks 365-390 function to select a calibration point CP when the S/D lever position has been increased, i.e., moved towards the 100 percent setting, since the last processing loop. If the lever's position is increasing and is not in one of the deadband regions T, the calibration point CP is set to the data point which is immediately below the present lever position. Again, this can better be understood through an example which is illustrated in FIG. 6C. Assume the previous loop calibration point was the 20 percent value in the forward direction. The S/D lever 32 has since been moved towards a position which is between the 60 percent and 80 percent speed settings. In such an instance, the blocks 370 to 390 function to set the calibration point equal to the 60 percent speed setting. Since this function is similar to that of the blocks 325-350, no further description will be provided.

After a calibration point CP is selected, control is returned to the MAIN program. The MAIN program then calls the CAL subroutine which is illustrated in the blocks 4F-G. The tests illustrated on FIG. 4F function such that calibration is only enabled when the calibration switch 58 is in the "ON" position, the throttle lever 48 is positioned at high idle and the engine 50 is operating. These conditions are checked in the blocks 400, 410 and 415, respectively. If any of these conditions is not met, control is returned to the MAIN program, thereby preventing operation of the calibration mode.

More specifically, in the block 400 the control checks to determine if the calibration mode is requested as indicated by the presence of a calibration signal from the calibration switch 58. If a calibration signal is detected, control is passed to the block 410. In the block 410 the control checks for the presence of a high idle signal HI from the first switch 52. If a high idle signal is detected, control is passed to the block 415 where an engine on test is performed. The test in the block 415 is performed by determining if the engine speed signal is greater than a preselected threshold. If engine speed exceeds the threshold, control is passed to the block 420 which calls a subroutine RSTA. The subroutine RSTA allows the operator to controllably increment and decrement the speed of the second (right) motor 12b.

The RSTA subroutine is shown in FIG. 4G. Initially, in the block 430, the sync valve 94 is moved to its first position, thereby blocking fluid communication between the first and second pump units 225a,b. This is accomplished by stopping production of the sync signal.

Control is then passed to the block 435 where upper and lower limits UL, IL for the calibration point CP are determined. More specifically, the ROM 74 has a table of nominal values of the first signal for each of the discrete data points in the first forward and reverse data tables. The controller retrieves the appropriate nominal value NV(I) from the ROM 74 and responsively calculates the upper and lower limits UL, LL. The upper limit UL is calculated by adding a predetermined value to the nominal value NV(I), whereas the lower limits LL is determined by subtracting a predetermined value from the nominal value NV(I). The upper and lower limits UL, LL are provided to limit the maximum amount each of the discrete data point can be adjusted.

Control is then passed to the block 440 where it is determined if an increment has been requested by checking for the presence of an increment signal. If the increment signal is detected, control is passed to the block 445 where the magnitude of the calibration point CP is incremented by a preselected amount. Next, control is passed to the block 450 where the incremented value of the calibration point CP is compared to the upper limit UL. If the calibration point CP exceeds the upper limit UL, control is passed to the block 455 where an out of range warning is issued on the indicator 98.

Otherwise, control is passed to the block 460 which causes the discrete data point DP(I) to be overwritten with the adjusted value of the calibration point CP. Similar steps are performed in the blocks 465-475 to allow the operator to decrement the speed of the second (right) motor 12b. Control is then returned to the main program. When the control is in the calibrate mode, the MAIN program branches to the block 210. In the block 210, the first and second control signals FS, SS are set to discrete data point corresponding to the calibration index I. If the value of the discrete data point in the second table has been adjusted, the right motor 12b will operate at a speed reflecting this change. The operator can continue adjusting the speed in the above described manner until the vehicle achieves rectilinear travel. Preferably, the calibration process is repeated for each discrete data point in both the second forward and reverse data tables.

INDUSTRIAL APPLICABILITY

When it becomes desirable to calibrate the drive motor speeds, the operator positions the calibration switch in the "ON" position. This causes the processor 24 to enter the calibration mode. The processor 24 responsively blocks production of the sync signal, thereby positioning the synchronizing valve 94 at the first position. The operator positions the S/D lever 32 at one of the discrete speed settings in either the forward or reverse direction. The processor 24 senses the position of the S/D lever 32 and causes the first and second motors 12a,b to operate at the commanded discrete speed. Because the synchronizing valve is at the first position any speed differential between the first and second motors 12a,b is manifested by a deviation of the vehicle from a rectilinear direction of travel.

An adjusting means is provided by the combination of the adjusting switch 62 and software. The adjusting means enables the operator to selectively increment and decrement the speed of the second motor 12b. More specifically, the processor 24 senses the presence of an increment or decrement signal from the adjusting switch and responsively increments or decrements the value of the second control signal to produce an adjusted second control signal.

If the adjusted control signal is valid, the corresponding discrete data point in the second data table is overwritten. The speed of the right motor in turn changes in response to the adjusted control signal. The operator continues to adjust the speed of the second motor in this manner until rectilinear vehicle travel is achieved. Preferably, the above process is repeated for each discrete speed setting in both the forward and reverse directions of travel, thereby calibrating the motor speeds over their entire operating range.

The present embodiment only allows the operator to adjust the speed of one motor; however, it should be apparent that it is within the scope of the present invention to allow adjustment of both motor speeds. Other aspects, objects and advantages of this invention can be obtained from a study of the drawings, disclosure and the appended claims.

We claim:

1. A drive system for a work vehicle, comprising:
an engine;
first and second pumps driven by the engine and being responsive respectively to first and second control signals to provide pressurized fluid in proportion thereto;
first and second fluid powered motors;
first and second closed loop hydraulic circuits interconnecting the first and second pumps to the first and second motors respectively and being adapted to communicate pressurized fluid from the pumps to the motors for driving the motors;
first and second ground engaging drive means connected to and powered by the first and second motors respectively;
a manually operable control element being movable between first and second limits for indicating a desired speed for the fluidly driven motors;
sensor means for sensing the position of the control element and responsively producing a desired motor speed signal;
memory device adapted to store data which relates the desired motor speed signal to the first and second control signals in a preselected manner;
processor means for receiving the desired speed signal, responsively retrieving at least a portion of the data from the memory device, and producing the first and second signals in response to the retrieved data and the desired speed signal;
adjusting means for receiving at least one of the control signals, permitting controllable adjustment of the control signal and producing an adjusted control signal so as to vary the speed of a respective motor; and
overwriting means for receiving the adjusted control signal and overwriting a portion of the stored data in response to the adjusted control signal.

2. A drive system according to claim 1 wherein the memory device contains first and second tables each having a preselected number of discrete data elements for relating the desired motor speed signal to the first and second control signals respectively, and wherein each of the discrete data elements corresponds to a different preselected percentage of a maximum speed for a respective motor.

3. A drive system according to claim 2 wherein the processor means retrieves at least a portion of the data points from the first and second data table and processes the retrieved data and the desired motor speed signal using linear interpretation to produce the first and second control signals.

4. A drive system according to claim 2 wherein the adjusting means is only operable when the first and second signals are equal to a discrete data point in the first and second data table, respectively.

5. A drive system according to claim 4 wherein the control element is infinitely variable between the first and second positions, and wherein the processor means includes a limiter means (FIG. 4C-E) for limiting the magnitude of the first and second signals to a corresponding discrete data point in the first and second data tables.

6. A drive system according to claim 1 wherein the first and second signals each consist of a forward and reverse signal and wherein both the first and second data tables are further divided into forward and reverse data tables, each data table having an equal number of discrete data elements for relating the desired motor speed signal to the first forward, second forward, first reverse and second reverse control signals, respectively, each of the data points corresponding a different preselected percentage of a maximum speed for a respective motor.

7. A drive system according to claim 6 wherein the adjusting means is only operable when the first and second control signals are equal to a discrete data point in a respective data table.

8. A drive system according to claim 7 wherein the control element is infinitely variable between the first and second positions, and wherein the processor means includes a limiter means for limiting the magnitude of the first and second signals to a corresponding discrete data point in the first and second data tables.

9. A drive system according to claim 1 wherein the adjusting means only permits adjustment of one of the first and second control signals.

10. A drive system according to claim 1 wherein the adjusting means incrementally adjusts at the control signal by a preselected amount.

11. A drive system according to claim 1 wherein the adjusting means compares the adjusted control signal to a preselected range and blocks production of the adjusted control signal if the adjusted control signal is outside the preselected range.

12. A drive system according to claim 1, further including an electrohydraulic synchronizing valve and a calibration switch, the synchronizing valve being interconnected between the first and second hydraulic circuits, the valve being normally biased to a first position at which interflow of hydraulic fluid between the first and second hydraulic circuits is blocked and being movable to a second position in response to a sync signal, the second position permitting interflow of hydraulic fluid between the hydraulic circuits for synchronizing the speeds of the first and second motors, the calibration switch being movable between a first and second positions and being adapted to produce a calibration signal when positioned at the second position, and wherein the processor means further receives the calibration signal and blocks production of the sync signal in response to receiving the calibration signal.

13. A drive system according to claim 12 wherein the adjusting means is only operable when the processor means receives the calibration signal.

14. A drive system according to claim wherein the memory device includes an electronically erasable programmable read only memory (EEPROM).

15. An apparatus for synchronizing the speeds of separate drive motors in a hydrostatic drive arrangement of a work vehicle, the drive arrangement including first and second fluid pumps driven by an engine and being responsive to a first and second control signals, respectively, to provide pressurized fluid in proportion thereto, first and second fluid powered motors first and second closed loop hydraulic circuit interconnecting the pumps and the motors and being adapted to communicate pressurized fluid from the pumps to the motors for driving the motors, and an electrohydraulic synchronizing valve interconnected between the hydraulic circuits, the valve being normally biased to a first position at which interflow of fluid between the circuits is blocked, and being movable in response to a sync signal to a second position which permits interflow of hydraulic fluid between the hydraulic circuits for synchronizing the speeds of the first and second motors comprising:

a manually operable control element being movable between first and second limits for indicating a desired speed and direction for the fluidly driven motors the first limit indicating full-speed forward and the second position indicating full-speed reverse;

sensor means for sensing the position of the control element and responsively producing a desired motor speed/direction signal;

memory device adapted to store data which relates the desired motor speed/direction signal to the first and second control signals in a preselected manner;

a calibration switch being movable between a first and second positions and being adapted to produce a calibration signal when positioned at the second position;

processor means for receiving the desired speed/direction signal and the calibration signal, blocking production of the sync signal in response to receiving the calibration signal, retrieving at least a portion of the data from the memory device, and processing the retrieved data and the desired speed/direction signal to produce the first and second signals;

adjusting means for receiving at least one of the control signals signal and permitting controllable adjustment of the magnitude of the received signal so as to vary the speed of a respective motor; and overwriting means for receiving the adjusted control signal and overwriting a portion of the stored data in response to the adjusted control signal.

16. An apparatus according to claim 15 wherein the memory device contains first and second tables each having a preselected number of discrete data elements for relating the desired motor speed signal to the first and second control signals respectively, and wherein each of the discrete data elements corresponds to a different preselected percentage of a maximum speed for a respective motor.

17. An apparatus according to claim 16 wherein the adjusting means is only operable when the first and second signals are equal to a discrete data point in the first and second data table, respectively.

18. An apparatus according to claim 17 wherein the control element is infinitely variable between the first and second positions, and wherein the processor means includes a limiter means (FIG. 4C-E) for limiting the magnitude of the first and second signals to a corresponding discrete data point in the first and second data tables.

19. An apparatus according to claim 15 wherein the first and second signals each consist of a forward and reverse signal and wherein the memory means includes first and second forward data tables and first and second reverse data tables, each data table having an equal number of discrete data elements for relating the desired motor speed signal to the first forward, second forward, first reverse and second reverse control, respectively, each of the data points corresponding the a different preselected percentage of a maximum speed for a respective motor.

20. A apparatus according to claim 19 wherein the adjusting means is only operable when the control signals are equal to a discrete data point in a respective data table.

21. An apparatus according to claim 20 wherein the control element is infinitely variable between the first and second positions, and wherein the processor means includes a limiter means
(FIGS. 4A-C) for limiting the magnitude of the first forward, second forward, first reverse and second reverse control signals to a discrete data point in respective first and second data tables.

22. An apparatus according to claim 15 wherein the adjusting means only permits adjustment of one of the first and second control signals.

23. An apparatus according to claim 15 wherein the adjusting means incrementally adjusts at the control signal by a preselected amount.

24. An apparatus according to claim 15 wherein the adjusting means compares the adjusted control signal to a preselected range and blocks production of the adjusted control signal if the adjusted control signal is outside the preselected range.

25. A drive system according to claim 15 wherein the memory device includes an electronically erasable programmable read only memory (EEPROM).

26. A method for synchronizing the speeds of separate drive motors in a hydrostatic drive arrangement of a work vehicle, the drive arrangement including first and second fluid pumps driven by an engine and being responsive to first and second control signals, respectively, to provide pressurized fluid in proportion thereto, first and second reversible fluid powered motors, first and second closed loop hydraulic circuit interconnecting the pumps and the motors and being adapted to communicate pressurized fluid from the pumps to the motors for driving the motors and synchronizing valve interconnected between the hydraulic circuits, the valve being normally biased to a first position at which interflow of fluid between the circuits is blocked, and being movable to a second position which permits interflow of hydraulic fluid between the hydraulic circuits for synchronizing the speeds of the first and second motors, the vehicle further including electronic control having a means for producing a desired motor speed signal, a memory device containing stored data for relating the desired motor speed signal to the first and second control signals, and a processor means for receiving the desired motor signal, retrieving at least a portion of the stored data from the memory device and processing the desired motor speed signal and retrieved data to produce the first and second control signals, comprising the steps of:

producing first and second control signals in response to the desired motor speed signal and the stored data;

positioning the synchronizing valve at the first position, whereby any speed difference between the first and second drive motors is manifested by a deviation of the vehicle from a rectilinear direction of travel;

controllably adjusting the magnitude of one of the control signals to vary the speed of a respective drive motor until the vehicle obtains a rectilinear direction of travel;

overwriting a portion of the stored data with data representing the magnitude of the adjusted control signal.

27. A method as set forth in claim 26 wherein the adjusting step is not executed if the adjusted control signal is not within a preselected range.

28. A method as set forth in claim 26 wherein the step of adjusting is performed by incrementally adjusting one of the control signals by a preselected amount.

* * * * *

UNITED STATES PATENT AND TRADEMARK OFFICE
CERTIFICATE OF CORRECTION

PATENT NO. : 5,249,422
DATED : October 5, 1993
INVENTOR(S) : Vernon R. Smith; Alan L. Stahl It is certified that error appears in the above-identified patent and that said Letters Patent is hereby corrected as shown below:

In claim 4, column 16, line 50, after "claim", add --1--.

In claim 19, column 17, line 60, after "corresponding", delete "the" and add --to--.

In claim 20, column 17, line 63, delete "A" and add --An--.

Signed and Sealed this

Eighth Day of November, 1994

Attest:

BRUCE LEHMAN

*Attesting Officer*          *Commissioner of Patents and Trademarks*